United States Patent
Zhu et al.

(10) Patent No.: US 7,154,068 B2
(45) Date of Patent: Dec. 26, 2006

(54) METHOD AND SYSTEM FOR A VEHICLE BATTERY TEMPERATURE CONTROL

(75) Inventors: Douglas Zhu, Canton, MI (US); Jacob Mathews, Canton, MI (US); Bob Taenaka, Plymouth, MI (US); Patrick Maguire, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/709,753

(22) Filed: May 26, 2004

(65) Prior Publication Data

US 2005/0274705 A1  Dec. 15, 2005

(51) Int. Cl.
*B60L 1/02* (2006.01)
*B60R 16/04* (2006.01)

(52) U.S. Cl. ............... 219/202; 219/209; 219/490; 219/492; 219/497; 429/7

(58) Field of Classification Search ........... 219/202, 219/209, 492, 494; 320/160, 15, 116, 150; 429/7; 209/497, 486
See application file for complete search history.

(56) References Cited

U.S. PATENT DOCUMENTS

| | | | |
|---|---|---|---|
| 4,209,736 A | 6/1980 | Reidenbach | |
| 4,321,646 A | 3/1982 | Ku | |
| 4,650,729 A | 3/1987 | Nakamura et al. | |
| 5,055,656 A * | 10/1991 | Farah et al. | 219/209 |
| 5,280,158 A * | 1/1994 | Matava et al. | 219/492 |
| 5,281,792 A * | 1/1994 | Lee et al. | 219/209 |
| 5,291,960 A | 3/1994 | Brandenburg et al. | |
| 5,362,942 A * | 11/1994 | Vanderslice et al. | 219/209 |
| 5,463,203 A | 10/1995 | Moore | |
| 5,508,126 A * | 4/1996 | Braun | 429/7 |
| 5,795,664 A * | 8/1998 | Kelly | 429/7 |
| 5,898,282 A | 4/1999 | Drozdz et al. | |
| 5,948,298 A * | 9/1999 | Ijaz | 219/209 |
| 5,990,660 A | 11/1999 | Meissner | |
| 5,990,661 A | 11/1999 | Ashtiani et al. | |
| 6,072,301 A | 6/2000 | Ashtiani et al. | |
| 6,163,135 A | 12/2000 | Nakayama et al. | |
| 6,271,648 B1 | 8/2001 | Miller | |
| 6,424,157 B1 * | 7/2002 | Gollomp et al. | 324/430 |
| 6,515,456 B1 * | 2/2003 | Mixon | 320/160 |
| 6,624,615 B1 * | 9/2003 | Park | 320/150 |

FOREIGN PATENT DOCUMENTS

| | | |
|---|---|---|
| DE | 42 16 020 C2 | 11/1993 |
| DE | 100 05 710 A1 | 8/2001 |
| DE | 102 60 551 A1 | 7/2004 |

* cited by examiner

*Primary Examiner*—Joseph Pelham
(74) *Attorney, Agent, or Firm*—David B. Kelley; Brooks & Kushman

(57) ABSTRACT

A system for heating a vehicle battery and a method for using the same. The system and method enable energy flow from the battery to a heater to heat the battery after determining a shut-down condition.

23 Claims, 2 Drawing Sheets

METHOD AND SYSTEM FOR A VEHICLE BATTERY TEMPERATURE CONTROL

BACKGROUND OF INVENTION

1. Field of the Invention

The present invention relates generally to battery operated vehicles, and more particularly to methods and systems for controlling vehicle battery temperature.

2. Background Art

Hybrid electric vehicles or pure electric vehicles typically include a high voltage battery to provide power for driving the vehicle. The performance of the vehicle and the service life of the battery can be affected by extreme temperature conditions.

Batteries tend to provide less discharge power and accept less charge when cold. This is a problem as it can reduce the benefit of using the battery and lead to inconsistent performance in cold weather conditions.

As discussed in U.S. Pat. No. 6,163,135, the charging and discharging of the battery during vehicle operation causes its internal resistances to heat the battery. One shortcoming of the design disclosed in the patent, however, is its inability to heat the battery when the vehicle is shut-off. This shortcoming is particularly disadvantageous as the battery can experience excessive cooling when shut-off.

A battery heater can be used during vehicle shut-off to heat the battery. The battery heater is typically a vehicle mounted component, which includes a cord or other electrical connector to connect the heater to a wall outlet or other remote source of electric energy. The disadvantage of such heaters is that a user is required to plug in the heater. Plugging in the heater, if a wall outlet or other remote source of electric energy is available, is inconvenient.

Accordingly, it would be desirable to provide a more convenient battery heater.

SUMMARY OF INVENTION

The present invention relates to a number of structures and features for heating a vehicle battery, including a battery heater that is controllable by a vehicle system controller or other vehicle controller. The battery heater can be positioned inside or near the battery to provide heat.

One aspect of the present invention relates to a heater that is electrically connected to the battery such that the heater receives energy from the battery to generate its heat. For example, the heater can be a positive temperature coefficient element, which increases resistance to current in response to decreasing ambient temperature. In addition, the heater can be a resistive element, which generates heat in proportion to the amount of current passed therethrough.

One aspect of the present invention relates to a method for controlling the battery heater. The method includes determining a key-off or other shut-down condition of the vehicle and, subsequent thereto, enabling energy flow from the battery to the heater to heat the battery.

The method can further include placing the heater controller in a sleep or suspend mode in response to determining the key-off condition prior to heating the battery. The "sleeping" controller can thereafter be placed into an active mode to determine whether the battery needs to be heated.

The method can further include preventing heating after a predetermined period of time after key-off. This can be done to ensure that the battery is not heated when the vehicle has been inactive for a prolonged period of time.

The method can further include heating the battery only if a battery state of charge (SOC) is greater than a predefined threshold. The amount of energy provide from the battery to the heater can be determined based on the battery SOC.

One advantage of the present invention is that the battery can be heated without requiring a user/operator to plug it into an outlet or perform other inconvenient steps to obtain a remote electric energy source.

Another advantage of the present invention is that the vehicle controller can be placed in a sleep mode to conserve energy and placed into an active mode thereafter to determine whether the battery needs heating.

Another advantage of the present invention is that the heater can be shut-off if the vehicle is not used for a prolonged period of time so that the battery energy can be conserved for later use.

DETAILED DESCRIPTION

Figure 1:
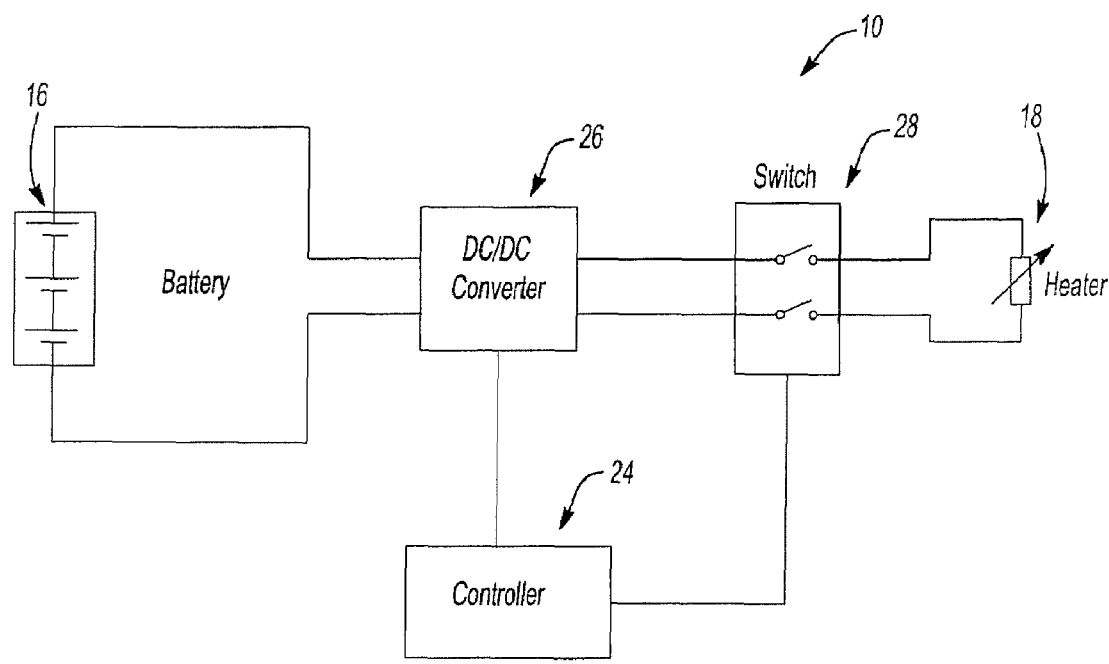
FIG. 1 illustrates a heating system in accordance with the present invention.

FIG. 1 illustrates heating system 10 in accordance with the present invention. Heating system 10 provides heat for heating battery 16.

Heating system 10 allows battery 16 to be heated without requiring any of the other vehicle components to be plugged into a power device remotely located from the vehicle. It is a self-heating system powered by battery 16.

Moreover, heating system 10 can be used with any battery-operated vehicle that includes a high voltage battery for driving a vehicle. In particular, heating system 10 can be used with battery 16 in vehicles that rely only on battery power for a traction motor.

In addition, heating system 10 can be used in hybrid electric vehicles that include an additional power source for use in driving the vehicle or for charging battery 16. For example, heating system 10 can be used with series hybrid electric vehicles (SHEV), parallel hybrid electric vehicles (PHEV), and parallel/series hybrid electric vehicles (PSHEV).

Heating system 10 includes heater 18 for generating heat for battery 16. Heater 18 can be any heater capable of providing heat or any electrically operable device that can be configured to generate heat based on energy provided by battery 16. It can be positioned inside or near battery 16 to provide heat thereto.

Preferably, heater 18 responds to current passed therethrough to provide heat. For example, heater 18 can a positive temperature coefficient element, such as a thermostat which increases resistance to current in response to decreasing ambient temperature.

In addition, heater 18 can be a conventional resistive element, which generates heat in proportion to the amount of current passed therethrough. Other heating elements and similar devices, however, could also be used without deviating from the scope of the present invention.

Heating system 10 further includes controller 24, DC/DC converter 26, and switch 28. Controller 24 controls DC/DC converter 26 and switch 28 to control power flow to heater 18.

In operation, DC/DC converter 26 converts the high voltage from battery 16 to a lower voltage for powering heater 18. For example, battery 16 can be a 300V battery DC/DC converter 26 can convert the 300V output of battery 16 to a 12V input to heater 18.

Switch 28 is a common double throw switch, which includes an off position and an on position. In the off position, no current flows to heater 18 and in the on position current flows to heater 18.

Other switches could be used, including variable control switches, which would provide additional current control to control heat generation.

Figure 2:
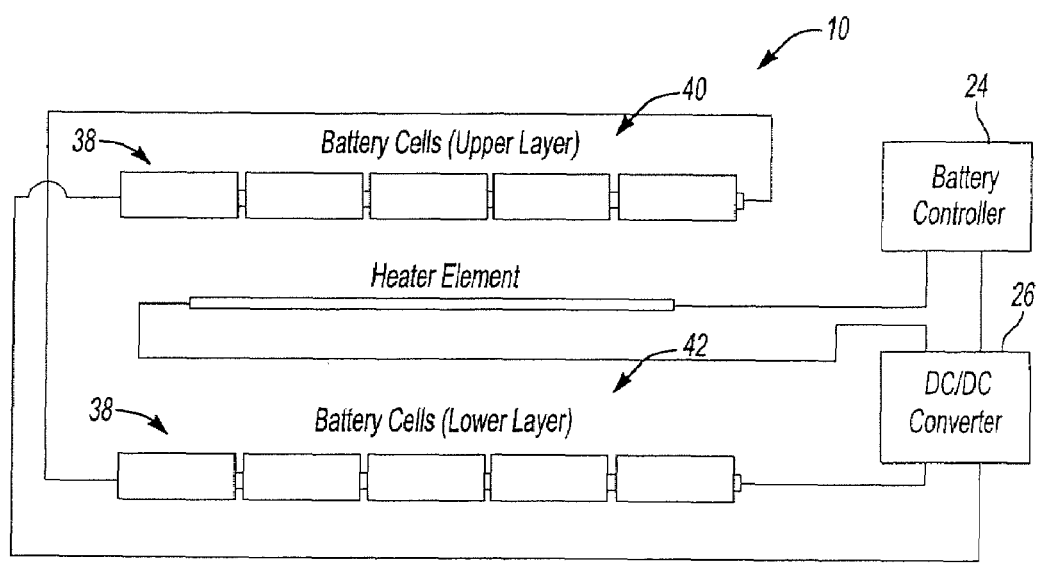
FIG. 2 illustrates the heating system with respect to a two-layered battery in accordance with the present invention.

FIG. 2 illustrates in more detail one configuration of heating system 10 wherein the heater 18 is disposed within battery 16.

Battery 16 can include a number of configurations for the various battery cells used therein, as one skilled in the art will appreciate. Battery 16 shown in FIG. 2 includes 240 battery cells 38 connected in a series configuration and arranged into two layers, top layer 40 and bottom layer 42.

Each layer includes 120 battery cells 38. For exemplary purposes, only 5 battery cells from each layer 40 and 42 are shown. As shown, heater 18 is disposed between top layer 40 and bottom layer 42 to provide the heat therein.

Other configurations and arrangements for heater 18 could be used without deviating from the scope of the present invention. In particular, heater 18 could be a blanket heater that wraps around individual battery cells of battery 16.

Figure 3:
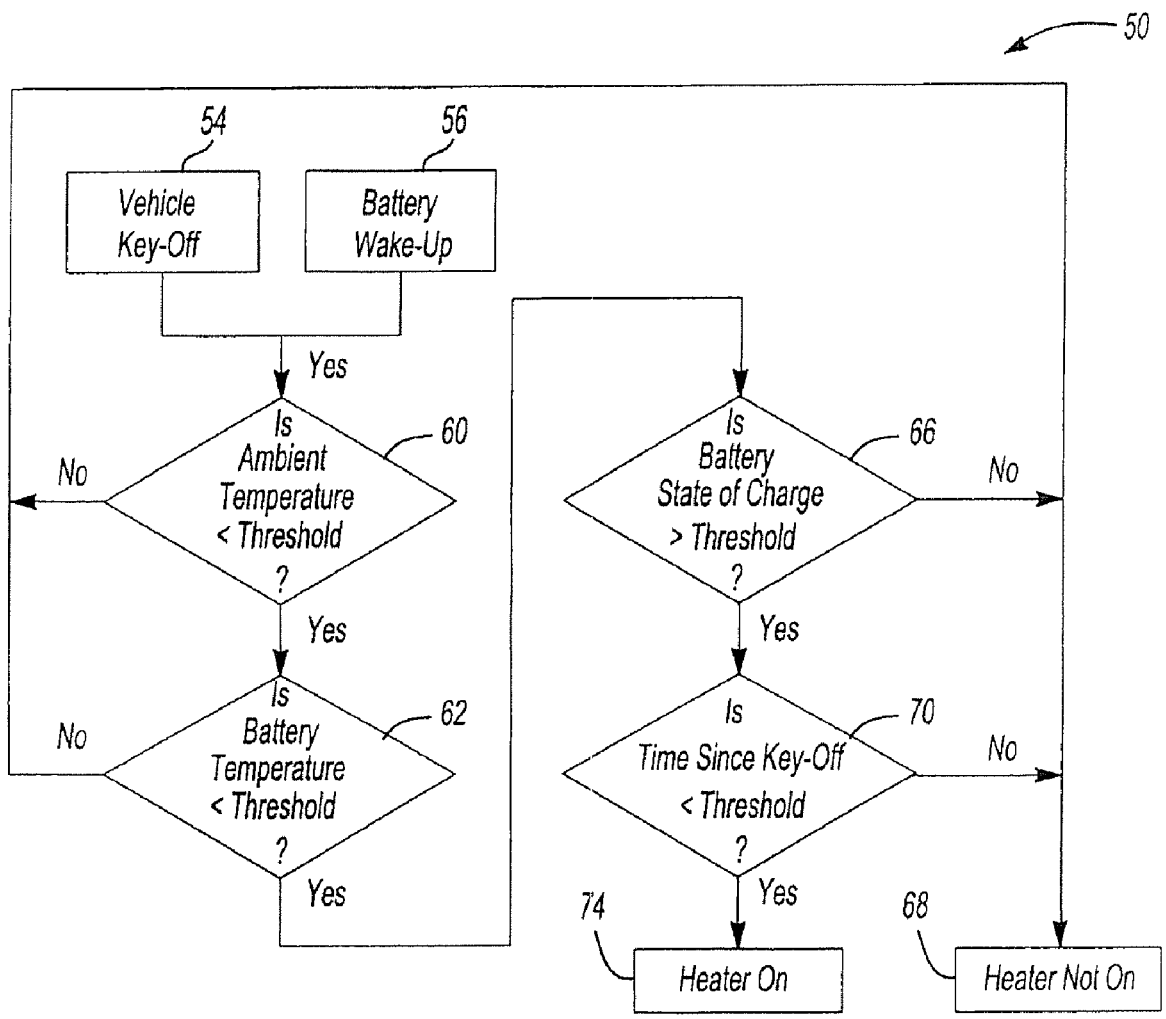
FIG. 3 illustrates a flow chart of software logic for controlling operation of the heating system in accordance with the present invention.

FIG. 3 illustrates flowchart 50 of the software logic for the method of the present invention for controlling heating system 10.

A key-off condition of the vehicle is determined at action block 54 at the start of the software routine. Key-off occurs when the driver turns the ignition key to the off position.

Key-off corresponds with non-use of the vehicle, and thus places various controllers in the vehicle, including controller 24, in a suspend or sleep condition. The controllers can be place in an active mode by internal timers or other control elements in the vehicle without requiring the key-on condition to be determined.

Action block 56 relates to waking up battery 16 after determining key-off in block. Battery 16 can be woken up in a number of different ways. In one embodiment of the present invention, controller 24 automatically wakes up the battery after a predetermined period of time after key-off to check battery 16.

The automatic wake-up typically occurs two hours after key-off. Two hours is an arbitrary time based on common vehicle usage and how long it takes batteries in general to cool after normal use. Shorter or longer intervals could be use. These intervals could be tied to the driving environment of the vehicle.

One purpose of the wake-up period is to give controller 24 an opportunity to check battery 16 and, if needed, heat battery 16. By constantly checking battery 16 in this manner, controller 24 can ensure battery 16 is heated all times, especially when the vehicle is needed for use.

Means other than a time delay could be used to wake up controller 24. These can include a remote starting device, such as a key FOB starter or other starting switch on the vehicle. Another means could include user-specified periods during which the user could program controller 24 using an input tool. Still another means could include controller 24 or other vehicle controller with intelligent logic for learning driving habits of the driver and determining when the driver is most likely to start the vehicle after shut-off.

At decision block 60 it is determined whether ambient air temperature is less than a predefined threshold after controller 24 wakes up. The ambient air temperature can be determined by controller 24 as it receives signals from an ambient air temperature sensor located on the vehicle.

Alternatively, controller 24 can calculate ambient air temperature based on other battery sensors. For example, controller 24 can include other sensors within battery for measuring battery temperatures and diagnosing the health of battery 16. These sensor could be used in the calculation of ambient temperature.

The predefined threshold corresponds with an ambient temperature below which the ambient temperature is sufficient to cool battery 16 such that battery 16 may need to be heated to prevent such cooling. For example, the ambient temperature threshold may be 10° C.

The ambient temperature threshold could also be time-based in that it can change over time. This can be done to reflect that less time is needed to cool battery 16 at lower temperatures than at high temperatures.

At decision block 62 it is determined whether battery temperature is less than a predefined threshold after controller 24 wakes up. The battery temperature can be determined by controller 24 for receiving signals from a battery temperature sensors, as described above.

The battery temperature threshold corresponds with a low temperature limit for battery 16, which is close to the temperature at which performance of battery 16 is affected by the low temperatures. For example, the battery temperature threshold may be 10° C.

At decision block 66 it is determined whether the state of charge (SOC) of battery 16 is greater than a predefined battery SOC threshold if blocks 60 and 62 determine that the ambient temperature is likely to cause undesired cooling of battery 16 (block 60) and that the battery temperature has actually cooled to an undesired temperature (block 62).

The battery SOC can be determined by controller 24 based on the various sensors controller 24 uses to control battery. One purpose for determining battery SOC is to determine how much power is available from battery 16 for powering heater 18. Accordingly, battery voltage could be used instead of calculating battery SOC.

The battery SOC threshold corresponds with a low SOC value for battery 16. This value preferably corresponds with a desired minimum battery charge level, which is still sufficient for starting the vehicle.

This low charge threshold is dependent on battery 16, its configuration and its desired operating parameters, but typically it is around 30% SOC.

At action block 68, if block 66 determines the battery SOC is not greater than the battery SOC threshold, the heater is turned off. As described above, this is commonly done to ensure that battery 16 has enough power to start the vehicle.

At decision block 70 it is determined whether key-off has occurred before expiration of a predefined non-use period of time. This predefined period of time is used to determine whether it is likely that the vehicle is to be parked or otherwise not in use for an extended period of time.

The non-use period of time can be any length of time, two days for example. This parameter can be changed depending on driver usage, but it is meant to limit heating of battery 16 if it is likely that vehicle is not going to be used, such as when it is parked in storage for a season.

If the key-off has not occurred before expiration of the predefined non-use period of time, the heater is turned off as shown at 68. As described above, this is commonly done to ensure that battery 16 is not heated unless there is a chance that the vehicle will be used.

If it is determined at 70 that key-off occurred prior to the expiration of the non-use period of time, the heating, as described above, includes drawing current from battery 16 for passage through heater 18 to generate heat.

In accordance with one aspect of the present invention, the amount of battery energy used for heating is proportional to an amount of heat needed to heat battery 16 and an amount of energy available from battery 16 for heating.

The amount of heat needed to heat battery 16 may be minor if the battery temperature is slightly less than the battery temperature threshold. In this case, controller 24 would calculate a lower amount of current for passage through heater 18 than it would if more heating were needed.

The amount of battery energy used is preferably limited to the battery SOC discharge threshold so that battery 16 always includes enough energy for starting the vehicle, regardless of how much heat is actually required to sufficiently heat battery 16. For example, controller 24 can determine the amount of heating based on the battery SOC or voltage that is determined. In particular, the difference between the battery SOC and the battery SOC threshold can correspond with the amount of battery energy to be used for heating. Thus, if the battery SOC is 35% and the battery SOC threshold is 30%, 5% of the battery SOC can be used for heating.

While the best mode for carrying out the invention has been described in detail, those familiar with the art to which this invention relates will recognize various alternative designs and embodiments for practicing the invention. All such designs and embodiments and equivalents thereof are defined by the following claims.

The invention claimed is:

1. A method for heating a battery in a vehicle having a battery heater, the method comprising:
   automatically determining a vehicle shut-down condition; and
   enabling energy flow from the battery to the heater to heat the battery after automatically determining the shut-down condition.

2. The method of claim 1, wherein a controller enables energy flow from the battery to the heater, the method further comprising the step of placing the controller in a suspend mode condition in response to the determination of the shut-down condition prior to enabling energy flow from the battery to the heater.

3. The method of claim 2, further comprising placing the controller in an active mode so as to enable energy flow from the battery to the heater for heating the battery thereafter.

4. The method of claim 3, further comprising waking up the controller from the suspend mode condition to place it in the active mode after a predetermined period of time after the shut-down condition.

5. The method of claim 1, further comprising determining an ambient temperature, wherein the enabling step is performed when an ambient temperature is less than a predefined threshold.

6. The method of claim 1, further comprising determining a battery temperature, wherein the enabling step is performed when the battery temperature is less than a predefined threshold.

7. The method of claim 1, further comprising determining a battery state of charge (SOC), wherein the enabling step is performed when the battery SOC is greater than a predefined threshold.

8. The method of claim 7, wherein the enabling step further comprises limiting energy flow from the battery to the heater based on the battery SOC.

9. The method of claim 1, further comprising determining a period of time during which the shut-down condition has been active, wherein the enabling step includes preventing energy flow from the battery to the heater when the shut-down time period is greater than a non-use time period so as to limit battery drain when the vehicle is not in use for a prolonged period of time.

10. A method for heating a battery in a vehicle having a battery heater and a vehicle system controller, the method comprising:
    determining a vehicle shut-down condition; and
    heating the battery by enabling energy flow from the battery to the heater after the vehicle controller determines the shut-down condition.

11. The method of claim 10, further comprising enabling energy flow from the battery to the heater if the following conditions exist:
    a battery temperature is less than a predefined battery temperature;
    a battery state of charge (SOC) is greater than a battery threshold SOC; and
    a predefined non-use period of time has not elapsed since determining the shut-down condition.

12. The method of claim 11, further comprising placing the controller in a sleep mode condition in response to determining shut-down and subsequently waking up the controller to determine whether the conditions for heating the battery exist.

13. A battery heating system for a vehicle, the system comprising:
    a heater for heating the battery; and
    a controller for determining a vehicle shut-down condition, the controller enabling energy flow from the battery to the heater to heat the battery after determining the shut-down condition.

14. The system of claim 13, wherein the controller is placed in a sleep mode condition in response to determining the shut-down condition and prior to heating the battery.

15. The system of claim 14, wherein the controller is placed in an active mode condition to enable energy flow from the battery to the heater.

16. The system of claim 15, wherein the step of placing the controller in the active mode includes waiting a predetermined period of time after shut-down.

17. The system of claim 13, wherein the controller determines an ambient air temperature and enables energy flow from the battery to the heater when the ambient temperature is less than a predefined threshold.

18. The system of claim 13, wherein the controller determines battery temperature and enables energy flow from the battery to the heater when battery temperature is less than a predefined threshold.

19. The system of claim 13, wherein the controller determines battery state of charge (SO C) and enables energy flow from the battery to the heater when the battery SOC is greater than a predefined threshold.

20. The system of claim 19, wherein the controller limits energy flow from the battery to the heater based on the battery SOC.

21. A method for heating a battery in a vehicle having a battery heater, the method comprising:
- determining a vehicle shut-down condition;
- enabling energy flow from the battery to the heater to heat the battery after determining the shut-down condition; and
- determining a period of time during which the shut-down condition has been active, wherein the enabling step includes preventing energy flow from the battery to the heater when the shut-down time period is greater than a non-use time period so as to limit battery drain when the vehicle is not in use for a prolonged period of time.

22. A method for heating a battery in a vehicle having a battery heater and a vehicle system controller, the method comprising:
- determining a vehicle shut-down condition; and
- heating the battery by enabling energy flow from the battery to the heater after the vehicle controller determines the shut-down condition if:
  - a battery temperature is less than a predefined battery temperature;
  - a battery state of charge (SOC) is greater than a battery threshold SOC; and
  - a predefined non-use period of time has not elapsed since determining the shut-down condition.

23. The method of claim 22, further comprising placing the controller in a sleep mode condition in response to determining shut-down and subsequently waking up the controller to determine whether the conditions for heating the battery exist.

* * * * *